United States Patent [19]

Magara et al.

[11] Patent Number: 5,073,691
[45] Date of Patent: Dec. 17, 1991

[54] WIRE ELECTRODE FEEDING DEVICE IN WIRE CUT ELECTRIC DISCHARGE MACHINE

[75] Inventors: Takuji Magara; Takeshi Iwasaki; Toshio Suzuki; Masahiro Yamamoto, all of Aichi, Japan

[73] Assignee: Mitsubishi Denki K.K., Tokyo, Japan

[21] Appl. No.: 457,787

[22] PCT Filed: Apr. 27, 1989

[86] PCT No.: PCT/JP89/00446

§ 371 Date: Dec. 29, 1989

§ 102(e) Date: Dec. 29, 1989

[87] PCT Pub. No.: WO90/12672

PCT Pub. Date: Jan. 11, 1990

[51] Int. Cl.⁵ .............................................. B23H 7/10
[52] U.S. Cl. ................................. 219/69.12; 219/69.14; 226/90; 226/97
[58] Field of Search ............... 219/69.12, 69.14, 69.19, 219/69.11; 140/139; 226/90, 97

[56] References Cited

U.S. PATENT DOCUMENTS 4,578,555 3/1986 Inoue .................................. 219/69.19

4,755,651 7/1988 Tsutsui et al. .................... 219/69.14

FOREIGN PATENT DOCUMENTS

| 59-14428 | 1/1984 | Japan | 219/96.12 |
| 188627 | 8/1987 | Japan | 219/96.14 |
| 123633 | 5/1988 | Japan | 219/96.12 |

*Primary Examiner*—Geoffrey S. Evans
*Attorney, Agent, or Firm*—Sughrue, Mion, Zinn, Macpeak & Seas

[57] ABSTRACT

In a wire electrode feeding device in a wire cut electric discharge machine, a roller unit having a fluid inlet, a fluid outlet, and a rotor which is rotated by fluid supplied thereinto, a guide pipe connected to the fluid outlet of the roller unit, and a wire electrode winding mechanism provided near the fluid outlet of the guide pipe are used to convey and remove the wire electrode which is conveyed through a lower electrode guide and an electric feeder. As the fluid is supplied into the roller unit through the fluid inlet, the rotor is rotated, so that the direction of movement of the wire electrode is changed, and the wire electrode is conveyed through the fluid outlet of the roller unit and the guide pipe to the wire electrode winding mechanism by the fluid, thus being discharged out of the machine.

13 Claims, 4 Drawing Sheets

WIRE ELECTRODE FEEDING DEVICE IN WIRE CUT ELECTRIC DISCHARGE MACHINE

FIELD OF THE INVENTION

This invention relates to a wire cut electric discharge machine, and more particularly to an improvement of a device for automatically feeding a thin wire electrode.

BACKGROUND OF THE INVENTION

In a wire cut electric discharge machine, a wire electrode is confronted with a workpiece with a small gap therebetween, and a pulse discharge is repeatedly caused between the workpiece and the wire electrode which is continuously fed, so that the workpiece is machined by the discharge energy. The wire electrode is generally thin, about 0.03 to 0.1 mm in diameter. FIG. 3 is a diagram showing the arrangement of an automatic wire electrode feeding device in a wire cut electric discharge machine which has been disclosed, for instance, by Japanese Patent Application (OPI) No. 80518/1985 (the term "OPI" as used herein means an "unexamined published application"). In FIG. 3, reference numeral 10 designates a workpiece to be machined which is mounted on an X-Y cross table (not shown) which is movable in a horizontal plane; 12a and 12b, machining start holes which are formed on a surface of the workpiece 10 in advance; 14, a guide supporting the wire electrode feeding device, the guide 14 being fixedly mounted on a shaft which is movable in the Z-axis direction of the wire cut electric discharge machine body (not shown); i.e., in a vertical direction; and 16, a slider forming a part of a moving mechanism 17, the slider 16 being slidable vertically along the guide 14. The slider 16 is engaged with a drive screw 18, the upper end portion of which is coupled to a drive motor 20 fixedly mounted on the upper portion of the guide 14, so that the slider 16 is automatically slid on the guide 14 by means of the drive screw 16 and the drive motor 20. A roller mechanism 22 is mounted on the slider 16. The roller mechanism 22 comprises a pair of pulleys, namely, a wire electrode feeding pulley 24 and a clamp pulley 26. The rotary shaft of the wire electrode feeding pulley 24 is coupled to a wire electrode feeding motor 28 which is fixed to the slider 16. The pulley 24 has a reverse rotation preventing mechanism 29. The clamp pulley 26 is rotatably supported on the end portion of a link 32 which is rotatably mounted on a pin 30 embedded in the slider 16. The rear end portion of the link 32 is coupled to the slider 16 through a coil spring 34, so that the clamp pulley 26 at the end of the link 32 is kept pushed against the wire electrode feeding pulley 24 by the elastic force of the coil spring 34.

Further in FIG. 3, reference numeral 36 designates a pipe guide (for instance 2 to 3 mm in outside diameter) into which a wire electrode 38 is inserted so as to be supported thereby. The upper end portion of the pipe guide 36 is secured through a mounting member 40 to the slider 16 forming the moving mechanism 17. A power source guide for slidably supporting the wire electrode 38 is fitted in the lower end portion of the pipe guide 36. A predetermined voltage is applied across the pipe guide 36 and the workpiece 10. When the pipe guide 36 is brought into contact with the workpiece 10, a detector 91 outputs a detection signal. In response to the signal, the drive motor 20 is stopped, and the wire electrode feeding motor 28 is driven, so that the wire electrode 38 is fed through the pipe guide 36. A clamp mechanism 42 is provided at the lower end portion of the guide 14, to fixedly support the pipe guide 36 at a predetermined position. The clamp mechanism 42 comprises: a clamp board 44a fixedly mounted on the lower end portion of the guide 14, the clamp board 44a having a V-groove; and a clamp board 44b coupled to a solenoid 46 which is fixedly mounted on the guide 14. Upon energization of the solenoid 46, the clamp board 44b is moved away from the clamp board 44a; that is, the clamp state is eliminated; that is, the pipe guide is released. When the solenoid is deenergized, the clamp board 44b is moved towards the clamp board 44a by the elastic force of a coil spring 48 which is interposed between the solenoid 46 and the clamp board 44b, so that the pipe guide is clamped again.

Further in FIG. 3, reference numeral 50 designates a cutting mechanism which operates to cut a wire electrode at a predetermined point, and remove the waste; and 52, an arm of the cutting mechanism body. The arm 52 is fixedly connected to the rotary shaft of a drive motor 54 secured to the side wall of the guide, so that the arm 52 is swung by the drive motor 54 in a horizontal plane. A rod 56 is provided inside the arm 52 in such a manner that it is slidable on the arm 52. A solenoid 58 is fixedly mounted on the arm 52. A link 62 is swingably mounted on a pin 60 embedded in the arm 52. When the solenoid 58 is energized, the rod 56 is moved towards the front end of the arm 52 through the link 62. A coil spring 64 is interposed between the rear end of the rod 56 and the side wall of the arm 52, so that, when the solenoid 58 is deenergized, the rod 56 is slid towards the rear end of the arm by the restoring of the coil spring 64. An edge 66 and a clamp pin 68 are fixedly secured to the front end face of the rod 56. The rod 56 is moved towards the front end of the arm 51, so that the wire electrode 38 inserted between the end face of the rod 56 and the inner side wall of the of the arm 52 is held with the clamp pin 68, and cut with the edge 66. A coil spring 70 is held between the clamp pin 68 and the end face of the rod 56 so as to suitably urge the clamp pin 68.

Further in FIG. 3, reference numeral 72 designates a lower electrode guide which is so positioned as to confront through the workpiece 10 to the electrode guide in the pipe guide 36. The lower electrode guide 72 supports the wire electrode 38 in position which is slidably inserted in it. A winding mechanism 74 is provided below the lower electrode guide 72. The winding mechanism 74 operates to wind the end portion of the wire electrode 38 which has been fed through the workpiece 10, and to wind the waste wire electrode broken off thereby to remove it from the workpiece. An electric feeder 100 is provided between the inlet of the winding mechanism 74 and the lower electrode guide 72, to supply current to the wire electrode 38. The electric feeder 100 and the workpiece 10 are connected to a machining electric power source 101. The winding mechanism 74 comprises three rollers 76a, 76b and 76c, and an endless belt 76d laid over the rollers 76a and 76c in such a manner that the three rollers are abutted against one another through the endless belt 76d. The rotary shaft of the roller 76b is coupled through rollers 79a and 79b and an endless belt 79c laid over the latter to a winding motor 76 and to a winding roller 79d. The winding roller 79d is abutted against a roller 79e. A guide pipe 79f is disposed between the winding sections. A voltage (93) is applied across the roller 79e and the wire electrode 38 above the pipe guide 36. When current flows therebetween, a detector 92 outputs a detection signal.

A tensioning mechanism 80 is provided above the guide 14, to prevent the slackening of the wire electrode 38; i.e., to tension the wire electrode as required at all times. The tensioning mechanism 80 comprises: a bobbin 82 on which the wire electrode 38 has been wound; and a torque motor 84 which rotates in the opposite direction to the direction of supply of the wire electrode 38 thereby to prevent the wire electrode from coming off the bobbin. That is, the torque motor 84 gives a certain resiliency to the bobbin 82 against the feeding of the wire electrode 38.

FIG. 4 is an enlarged sectional view showing a part of the wire electrode feeding device thus constructed in which the wire electrode is fed penetrating the workpiece. In FIG. 4, those components which have been already described with reference to FIG. 3 are therefore designated by the same reference numerals. Further in FIG. 4, reference numeral 90 designates the aforementioned electrode guide fitted in the end portion of the pipe guide 36. The electrode guide is so designed that a die-shaped guide 95 made of diamond is fitted in the pipe guide 36 through a sintered metal part. The lower electrode guide 72 located below the workpiece 10 comprises a die-shaped guide 97 made of diamond which is fixedly supported on a sintered metal part 98. The lower electrode guide 72 has a wire introducing part 99 in the form of a funnel which is extended to the die-shaped guide 97. The diameter of the inlet of the wire introducing part 99 is larger than the outside diameter of the pipe guide 36. The center of the lower electrode guide 72 and the inlet of the winding mechanism; i.e., the contact surface of the roller 76b and the endless belt 76d are substantially coaxial positioned. The electric feeder 100 is so positioned that its inner surface which contacts the wire electrode 38 is shifted (for instance 0.5 to 3 mm) from the axis of the lower electrode guide. The electric feeder 100 has a wire electrode introducing part in the form of a funnel the diameter of which is larger than that of the outlet of the lower electrode guide 72.

With the wire cut electric discharge machine thus constructed, the wire electrode 38 is automatically inserted into the machining start holes 12a and 12b formed in the workpiece 10 as follows: The pipe guide 36 is moved relative to the workpiece 10 until it is in alignment with the hole 12a for instance. Under this condition, the solenoid 46 is operated to release the clamping mechanism 42 thereby to release the pipe guide 36. Thereafter, the drive motor 20 is operated to lift the slider 16 along the guide 14 so that the pipe guide 36 is lifted to the top of the guide 14. Under this condition, the roller mechanism 22 of the slider 16 is operated to feed the wire electrode in the pipe guide 36 until the end portion of the wire electrode appears from the lower end of the pipe guide 36 to a desirable length. The drive motor 54 of the cutting mechanism 50 is operated to turn the arm 52 180° towards the wire electrode 38, and the solenoid 58 is energized so that the wire electrode 38 is cut with the edge 66 provided a the end of the rod 56 in such a manner that the wire electrode 38 remains a predetermined length (for instance 3 to 10 mm) from the lower end of the pipe guide 36. With the waste wire electrode clamped with the clamp pin 68 provided at the end of the rod 56, the drive motor 54 is operated to return the arm 52 to the original position. Under this condition, the clamp pin 68 is released to remove the waster wire electrode cut off. Thereafter, the drive motor 20 located above the guide 14 is operated to move the slider 16 down the guide 14. If, in this case, the diameter of the hole 12a of the workpiece 10 is larger than the outside diameter of the pipe guide 36 secured to the slider 16, then the pipe guide 36 is inserted into the hole 12a to come before the electrode guide 72 located below the workpiece, as shown in FIG. 4. When the diameter of the hole 12a is smaller than the outside diameter of the pipe guide 36, the pipe guide 36 is moved downwardly until it contacts the workpiece 20 and the detector 92 operates. Thereafter, the roller mechanism 22 on the slider 16 is operated to feed the wire electrode 38 in the pipe guide 36. Thus, the wire electrode is inserted into the electrode guide 95 and the lower electrode guide 72. The end portion of the wire electrode thus inserted, being guided by the wire electrode introducing part 100b of the electric feeder 100, reaches the winding mechanism 74, where it is wound. When the wire electrode 38 reaches the rollers 79d and 79e, the detector 92 operates to stop the roller mechanism 22 and the winding mechanism 74, and to activate the drive motor 20. As a result, the slider 16 is moved up the guide 14, so that the pipe guide 36 is disengaged from the workpiece 10. When the pipe guide thus disengaged comes to a predetermined position, the solenoid is restored so that the lower end portion of the pipe guide 36 is secured to the guide 14 with the clamping mechanism 42 at the lower end of the guide 14. Thus, the wire electrode 38 has been automatically fed and inserted into the machining start hole of the workpiece. Now, electric current can be positively applied to the wire electrode 38 any time.

Now, in the case where an abnormal condition takes place during machining to break the wire electrode, an operation of automatically feeding the wire electrode again will be described.

When the wire electrode 38 is broken, the reverse rotation preventing mechanism 29 of the roller mechanism 22 on the slider 16 operates so that the wire electrode 38 is maintained in the pipe guide 36 although the tensioning mechanism 80 above the guide 14 acts on the wire electrode; that is, the wire electrode is held clamped by the roller mechanism 22. Accordingly, the wire electrode 38 between the bobbin 82 and the pipe guide 36 is maintained stopped, and the rotation of a rotation detector 86 is stopped, thus indicating the breakage of the wire electrode 38. In this case, the clamping mechanism 42 at the lower end of the guide 14 is operated to release the pipe guide 36, and the drive motor 20 is operated to lift the pipe guide 36 to the top of the guide 14. The waste wire electrode broken off is removed from the workpiece by operating the winding mechanism 74. Thereafter, the pipe guide 36 is moved relative to the workpiece 10 until it is in alignment with the machining start hole 12a of the workpiece 10. Under this condition, the wire electrode feeding device is operated according to the above-described method of inserting a wire electrode into a machining start hole of a workpiece; that is, the wire electrode 38 is automatically caused to penetrate the workpiece 10 through the hole 12a. Then, the wire electrode 38 is moved along the machining locus formed on the workpiece to the point where the wire electrode was broken, and the electric discharge machining operation is started again. The above-described movement of the wire electrode 38 relative to the workpiece 10 is automatically carried out by a CNC (computerized numerical control) unit (not shown) provided for the wire cut electric discharge machine.

The conventional wire electrode feeding device is constructed as described above. Therefore, in automatically feeding a thin wire electrode (38) low in rigidity, the wire electrode 38 may be wound at the endless belt 76d, or the load inside the guide pipe 79f may obstruct the movement of the wire electrode 38, whereby the wire electrode cannot be positively removed. In addition, the device is rather troublesome in maintenance because the belts 76d and 79c are relatively low in durability, or it may go wrong because of the machining sludge sticking to the roller 79b or the endless belt 76d.

DISCLOSURE OF THE INVENTION

An object of the invention is to eliminate the above-described difficulties accompanying a conventional wire electrode feeding device in a wire cut electric discharge machine. More specifically, an object of the invention is to provide a wire electrode feeding device for a wire cut electric discharge machine which can feed a thin wire electrode automatically and positively.

In a wire electrode feeding device in a wire cut electric discharge machine according to the invention, a roller unit having a fluid inlet, a fluid outlet, and a rotor which is rotated by fluid supplied thereinto, a guide pipe connected to the fluid outlet of the roller unit, and a wire electrode winding mechanism provided near the fluid outlet of the guide pipe are used to convey and remove the wire electrode which is conveyed through a lower electrode guide and an electric feeder.

BEST MODE FOR CARRYING OUT THE INVENTION

Figure 1:
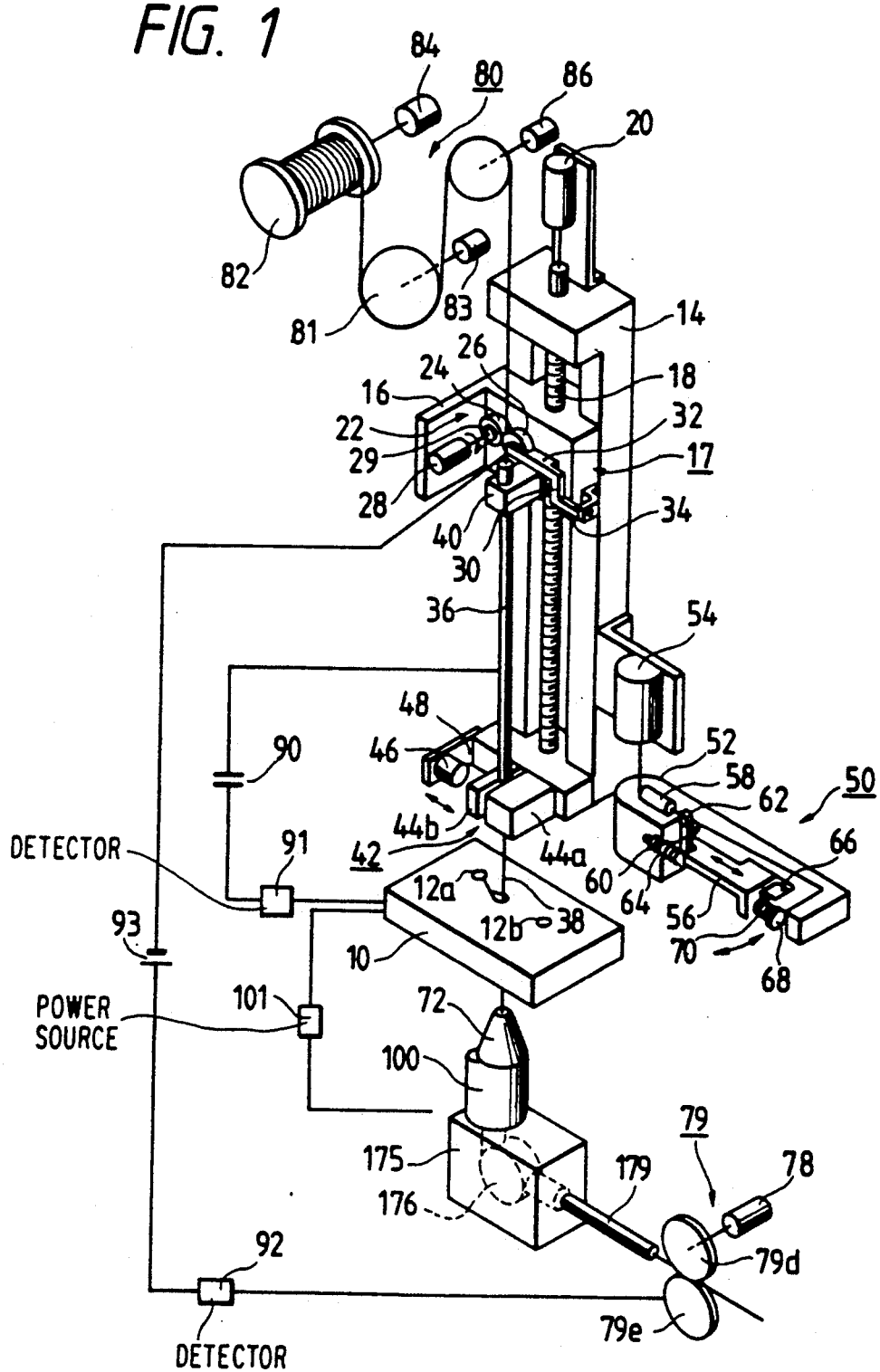
FIG. 1 an explanatory diagram showing the arrangement of one example of a wire electrode feeding device in a wire cut discharge machine according to the invention.
Figure 2:
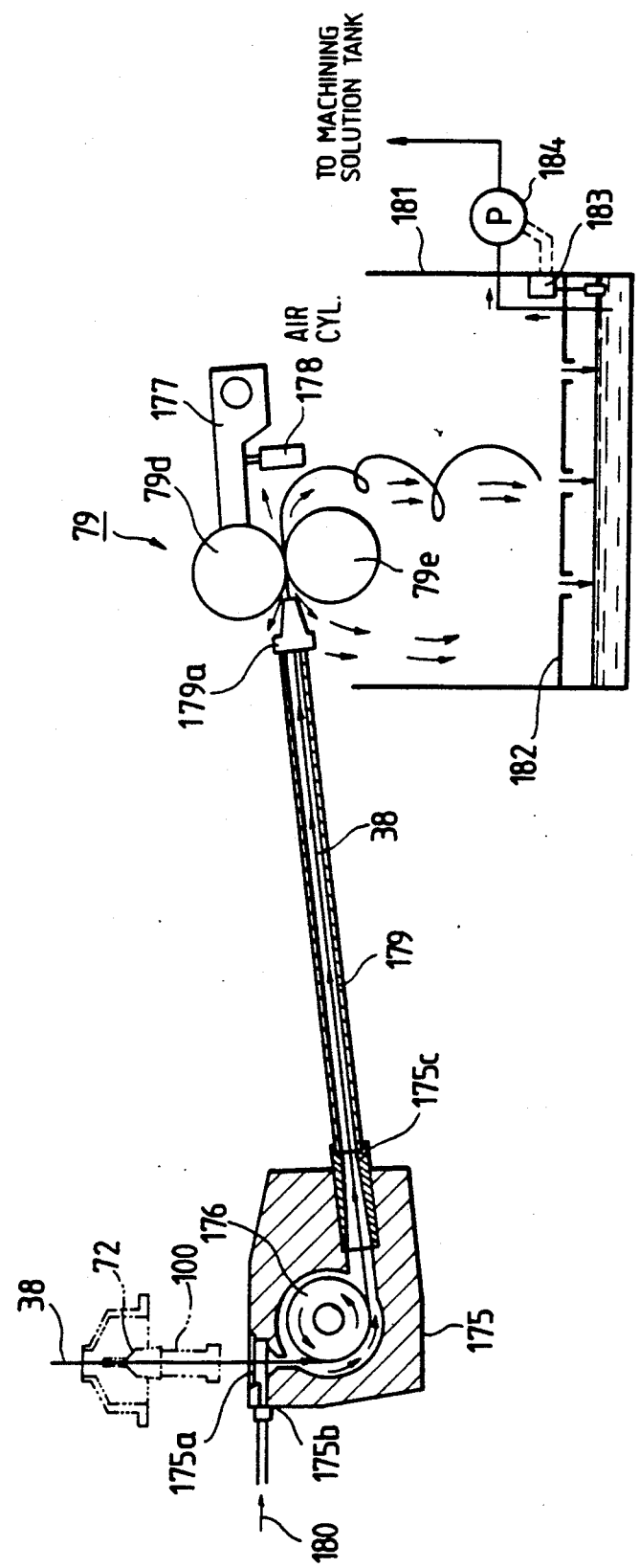
FIG. 2 is an explanatory diagram showing essential components of the wire electrode device according to the invention in detail.
Figure 3:
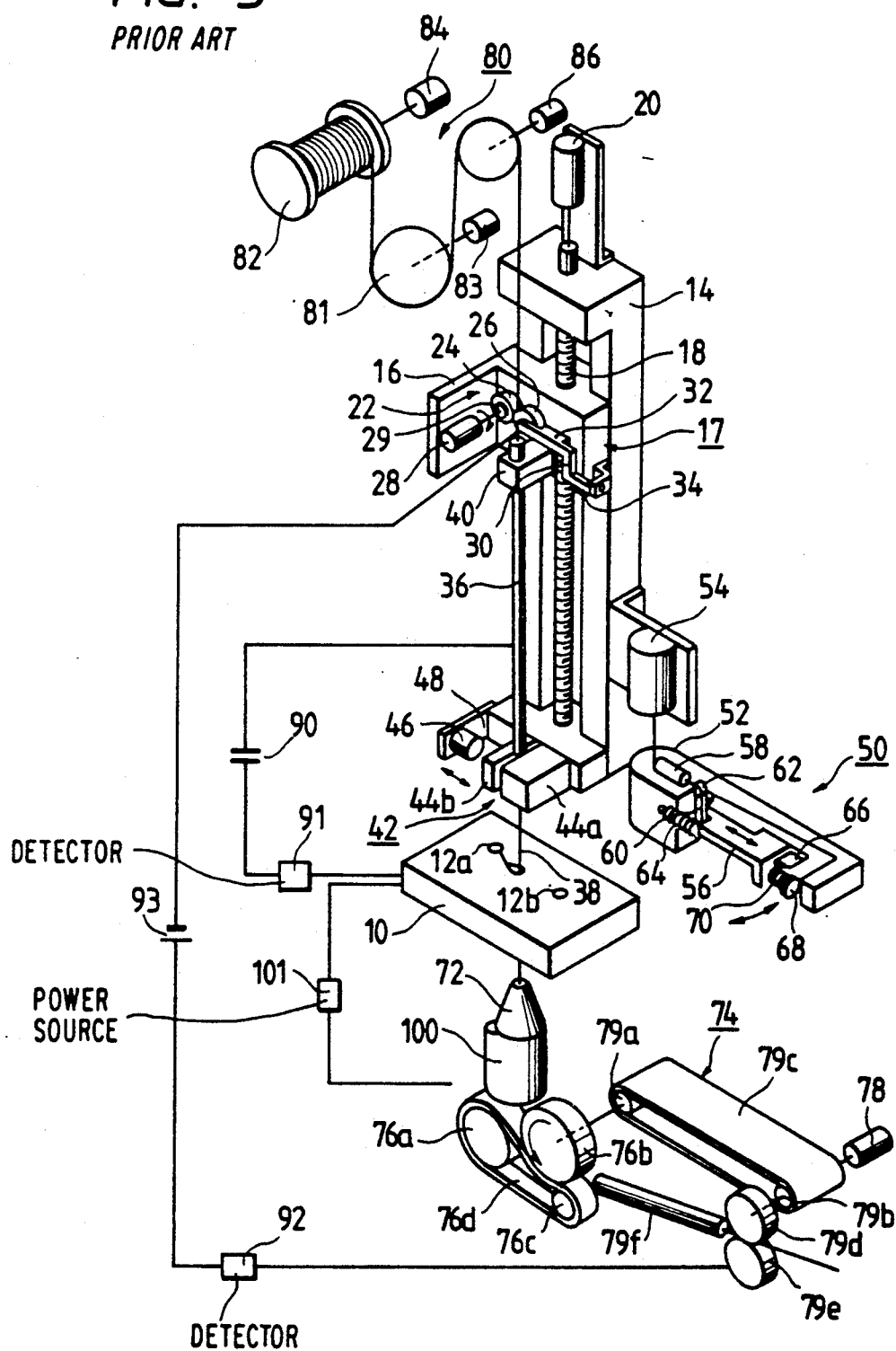
FIG. 3 an explanatory diagram showing the arrangement of one example of a conventional wire electrode feeding device.
Figure 4:
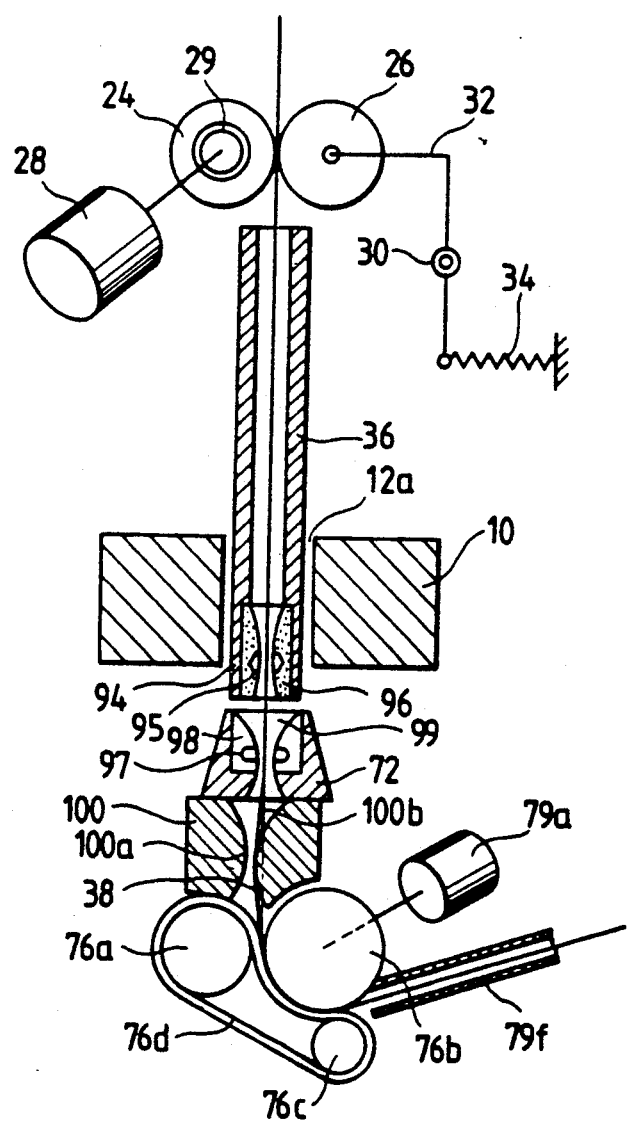
FIG. 4 is an explanatory diagram showing essential components of the conventional wire electrode feeding device.

One embodiment of this invention will be described with reference to the accompanying drawings. FIG. 1 is an explanatory diagram showing the arrangement of a wire electrode feeding device according to the invention. In FIG. 1, those components which have been already described with reference to the conventional wire electrode feeding device are therefore designated by the same reference numerals or characters. FIG. 2 is an explanatory diagram showing the arrangement of a wire electrode winding section.

In FIGS. 1 and 2, reference numeral 175 designates a roller unit; 175a, an accumulator for receiving the wire electrode 38 from the electric feeder 100; 175b and 175c, a fluid inlet and a fluid outlet, respectively; 176, a pulley, a rotor, which is rotatably mounted in the roller unit 175; 180, the fluid, conveying water, which is supplied into the roller unit 175 through the fluid inlet 175b by a pump (not shown); and 179, a guide pipe extended from the roller unit 175 to the recovery rollers 79d and 79e forming the wire electrode winding mechanism 75. The guide pipe 179 has a nozzle 179a at the end to jet the conveying water 180. Further in FIGS. 1 and 2, reference numeral 177 designates a lever member secured to the roller 79d; 178, an air cylinder for moving the lever member 177 to open and close the rollers; 181, a recovery box for recovering the wire electrode 38 and the conveying water 180; 182, a separating board for separating the wire electrode 38 and the conveying water 180 from each other; 183, a float switch for detecting the level of the conveying water 180 recovered in the recovery tank; and 184, a pump which is operated by the float switch 183.

Now, the operation of the wire electrode feeding device thus constructed will be described.

As was described, when the wire electrode is broken by abnormal conditions occurring before or during a machining operation, automatically the waste wire electrode 38 broken off is removed from the workpiece 10 and the wire electrode 38 is fed to the workpiece 10. In this operation, the pump (not shown) is operated to supply the conveying water 100 from the machining solution tank into the roller unit 175. The conveying water 100 thus supplied, as indicated by the arrows in FIG. 2, is caused to flow from the inside of the roller unit 175 through the guide pipe 175 to the recovery roller section 79d and 79e, where it is allowed to drop into the recovery box. In the guide pipe 179, the conveying water conveys the wire electrode 38, and, in the roller unit 175, it rotates the pulley 176 in the direction of the arrows. The pulley 176, being rotated, reduces the load which is induced in the roller unit 175 when the wire electrode 38 changes in the direction of movement, and drives the wire electrode 38. The conveying water 180 passed through the guide pipe 179 is discharged at the roller section (79d and 79e), so that it is recovered into the recovery box 181 together with the wire electrode 38. In this operation, the conveying water 180 is separated from the wire electrode 38 by means of the separating board 182, thus being held in the bottom portion of the recovery box. When the level of conveying water 180 reaches the predetermined value in the recovery box 181, the float switch 183 is activated to operate the pump 184, whereby the conveying water 181 is returned to the machining solution tank (not shown). In discharging the conveying water 180 at the roller section (79d and 79e), by opening the roller section the conveying water 180 is allowed to flow smoothly, with the results that the loss of pressure at the outlet of the guide pipe is reduced, and the quantity of conveying water 180 can be maintained at a predetermined value. During removal of the waster wire electrode 38, the roller 79d is raised through the lever member 177 by the air cylinder 178 so as to be spaced from the roller 79e. After the waste wire electrode has been removed, the roller 79 is returned to the original position, so that the wire electrode 38 is moved on while being held between the pair of rollers 79d and 79e.

Thus, after the waste wire electrode has been removed, similarly as in the conventional method the wire electrode 38 is automatically fed to penetrate the workpiece 10, so that the electric discharge machining operation can be started again.

In the above-described embodiment, the conveying fluid is water; however, the same effect can be obtained by using other fluids such as air and oil. It is not always necessary to use the guide pipe; that is, the guide pipe may be eliminated by providing the wire electrode winding mechanism 79 near the fluid outlet 175c of the roller unit 175.

As was described above, in the wire electrode feeding device of the invention, the wire electrode passing through the electric feeder is removed by the flow of fluid and by the rotor which is rotated by the fluid, and therefore when the wire electrode is broken, the waste wire electrode formed is removed efficiently and positively. Thus, the wire electrode feeding device provided according to the invention for a wire cut electric discharge machine can positively perform the automatic feeding of a wire electrode in a wire cut electric discharge machining operation.

INDUSTRIAL APPLICABILITY

The invention can be widely applied to the case where a wire cut electric discharge machine is used to machine a metal workpiece or the like.

We claim:

1. A wire electrode feeding device for use in a wire cut electric discharge machine, said device comprising:
    a pipe guide with an electrode guide for slidably supporting a wire electrode;
    a lower electrode guide positioned so as to confront, through a workpiece said pipe guide, said lower electrode guide slidably supporting said wire electrode;
    a moving mechanism for moving said pipe guide towards said lower electrode guide;
    a clamping mechanism for fixing said pipe guide at a predetermined position;
    a roller mechanism comprising a pair of rollers for inserting said wire electrode into said pipe guide, said roller mechanism being moved together with said pipe guide, and having a reverse rotation preventing means for preventing removal of said wire electrode from said pipe guide when said wire electrode is broken;
    a cutting mechanism for cutting said wire electrode at a predetermined point, and removing a waste portion of said wire electrode cut off;
    a tensioning mechanism for tensioning said wire electrode;
    an electric feeder with a contact through which current is supplied to said wire electrode;
    a roller unit having a means for receiving said wire electrode coming from said electric feeder, a fluid inlet, a fluid outlet, and a rotor which is rotated by fluid supplied thereinto;
    a guide pipe connected to said fluid outlet of said roller unit, for introducing said fluid; and
    a wire electrode winding mechanism comprising a pair of rollers provided near the fluid outlet of said guide pipe, wherein the wire electrode winding mechanism comprises:
    a pair of winding rollers for winding out said wire electrode;
    a lever member secured to one of said winding rollers; and
    means for moving said lever member to open and close said winding rollers; wherein said one of said winding rollers is raised through said lever member by said moving means during removal of a waste portion of said wire electrode.

2. The wire electrode feeding device as claimed in claim 1, wherein said direction of movement of said wire electrode is changed by said rotation of said rotor, and said wire electrode is conveyed through said fluid outlet of said roller unit and said guide pipe to said wire electrode winding mechanism by said supplied fluid.

3. The wire electrode feeding device as claimed in claim 1, wherein said fluid is selected from the group consisting of water, air and oil.

4. A wire electrode feeding device for use in a wire cut electric discharge machine, said device comprising:
    a pipe guide with an electrode guide for slidably supporting a wire electrode;
    a lower electrode guide positioned so as to confront, through a workpiece, said pipe guide, said lower electrode guide slidably supporting said wire electrode;
    a moving mechanism for moving said pipe guide towards said lower electrode guide;
    a clamping mechanism for fixing said pipe guide at a predetermined position;
    a roller mechanism comprising a pair of rollers for inserting said wire electrode into said pipe guide, said roller mechanism being moved together with said pipe guide, and having a reverse rotation preventing means for preventing removal of said wire electrode from said pipe guide when said wire electrode is broken;
    a cutting mechanism for cutting said wire electrode at a predetermined point, and removing a waste portion of said wire electrode cut off;
    a tensioning mechanism for tensioning said wire electrode;
    an electric feeder with a contact through which current is supplied to said wire electrode;
    a roller unit having a means for receiving said wire electrode coming from said electric feeder, a fluid inlet, a fluid outlet, and a rotor which is rotated by fluid supplied thereinto;
    a guide pipe connected to said fluid outlet of said roller unit, for introducing said fluid;
    a wire electrode winding mechanism comprising a pair of rollers provided near the fluid outlet of said guide pipe;
    a collecting tank for collecting the waste wire electrode and said fluid;
    a float switch for detecting the level of said fluid filled in said tank; and
    a pump which is operated by said float switch.

5. A method for feeding a wire electrode in a wire electrode discharge machine, said method comprising the steps of:
    supplying a fluid from an inlet of a roller unit having a rotor;
    conveying said wire electrode and rotating said rotor by said fluid;
    passing said wire electrode through a pipe guide by said fluid;
    winding said wire electrode by a winding mechanism having a pair of rollers provided near said fluid outlet of said pipe guide; and
    collecting said wire electrode and said fluid into a collecting tank wherein when the level of fluid reaches a predetermined level in said collecting tank a float switch is activated to operate a pump, whereby said conveying fluid is returned to a machining solution tank.

6. A wire electrode feeding device used in a wire cut electric discharge machine comprising:
    a roller unit having a fluid inlet, a fluid outlet and a rotor which is rotated by fluid supplied thereinto; and a wire electrode winding mechanism having a pair of winding rollers, wherein said wire electrode winding mechanism comprises:

a pair of winding rollers for winding out said wire electrode;

a lever member secured to one of said winding rollers; and means for moving said lever member to open and close said winding rollers; wherein said one of said winding rollers is raised through said lever member by said moving means during removal of a waste portion of said wire electrode.

7. The wire electrode feeding device as claimed in claim 6, wherein said fluid is selected from the group consisting of water, air and oil.

8. A wire electrode feeding device as claimed in claim 6, further comprising a guide pipe connected to the fluid outlet of said roller unit, said wire electrode winding mechanism being provided near said outlet of said guide pipe.

9. The wire electrode feeding device as claimed in claim 8, wherein said direction of movement of said wire electrode is changed by the rotation of said rotor, and said wire electrode is conveyed through said fluid outlet of said roller unit and said guide pipe to said wire electrode winding mechanism by said supplied fluid.

10. The wire electrode feeding device as claimed in claim 8, wherein said fluid is selected from the group consisting of water, air and oil.

11. A wire electrode feeding device used in a wire cut electric discharge machine comprising:

a roller unit having a fluid inlet, a fluid outlet and a rotor which is rotated by fluid supplied thereinto; and a wire electrode winding mechanism having a pair of winding rollers;

a guide pipe connected to the fluid outlet of said roller unit, said wire electrode winding mechanism being provided near said outlet of said guide pipe;

a collecting tank for collecting a waste portion of said wire electrode and said fluid;

a float switch for detecting the level of said fluid filled in said tank; and a pump which is operated by said float switch.

12. A method for feeding a wire electrode in a wire electrode discharge machine, said method comprising the steps of:

supplying a fluid from an inlet of a roller unit having a rotor;

conveying said wire electrode and rotating said rotor by said fluid;

passing said wire electrode through a pipe guide by said fluid;

winding said wire electrode by a winding mechanism having a pair of rollers provided near said fluid outlet of said pipe guide;

forming said winding mechanism so as to comprise a lever member secured to one of said rollers, and means for moving said lever member to open and close said winding rollers; and collecting said wire electrode and said fluid into a collecting tank.

13. The method for feeding said wire electrode as claimed in claim 12, wherein said pair of rollers are opened to allow said fluid to flow smoothly during removal of a waste portion of said wire and electrode.

* * * * *